Sept. 30, 1969  R. R. PIZZAGALLI  3,469,298
PIPE PULLING APPARATUS
Filed Oct. 4, 1966  2 Sheets-Sheet 1
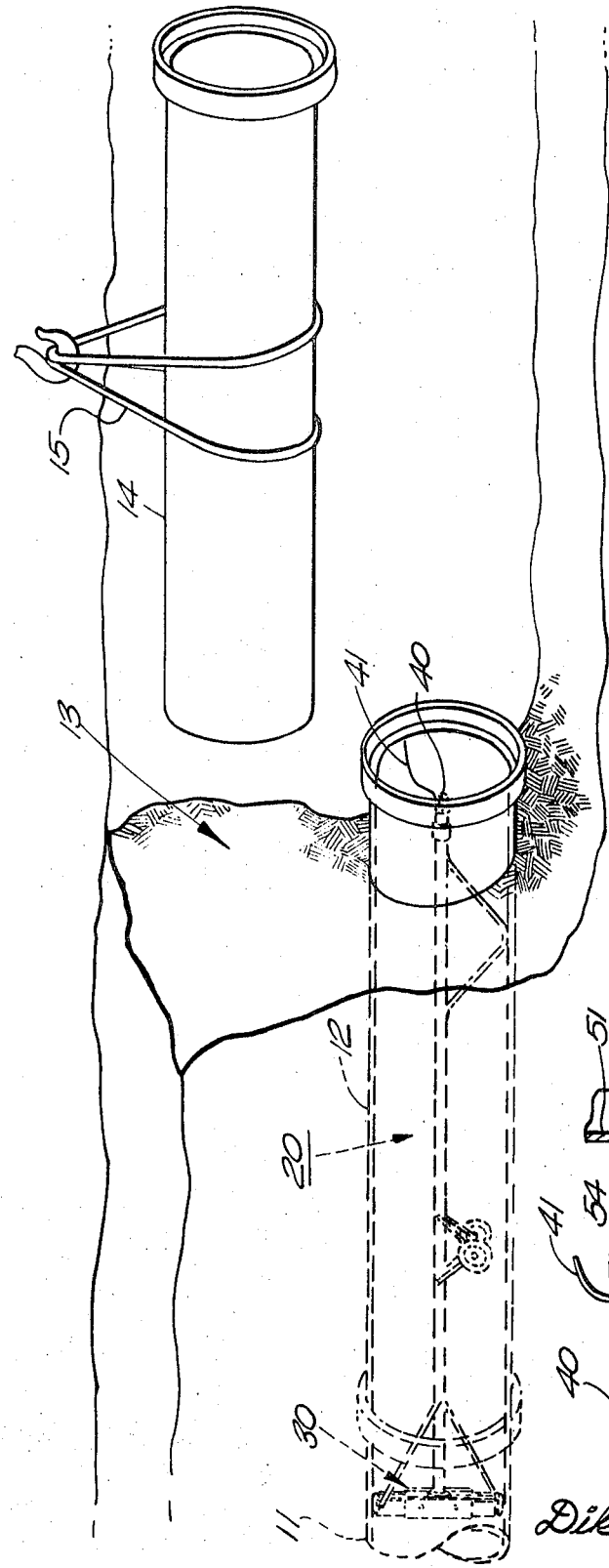
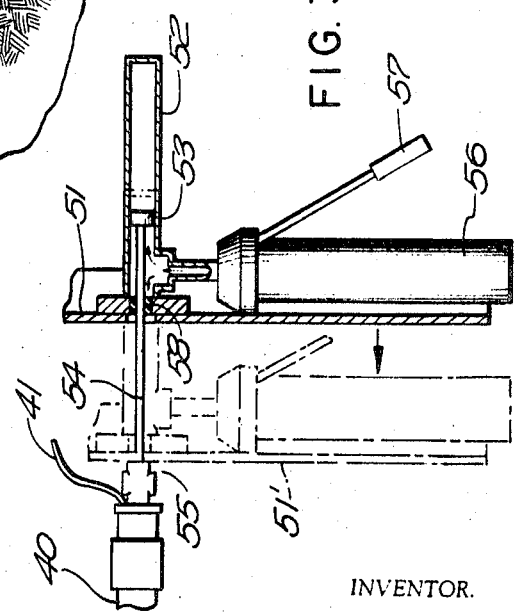
INVENTOR.
REMO R. PIZZAGALLI
BY
*Dike, Thompson, & Bronstein*
ATTORNEYS Sept. 30, 1969  R. R. PIZZAGALLI  3,469,298
PIPE PULLING APPARATUS
Filed Oct. 4, 1966  2 Sheets-Sheet 2
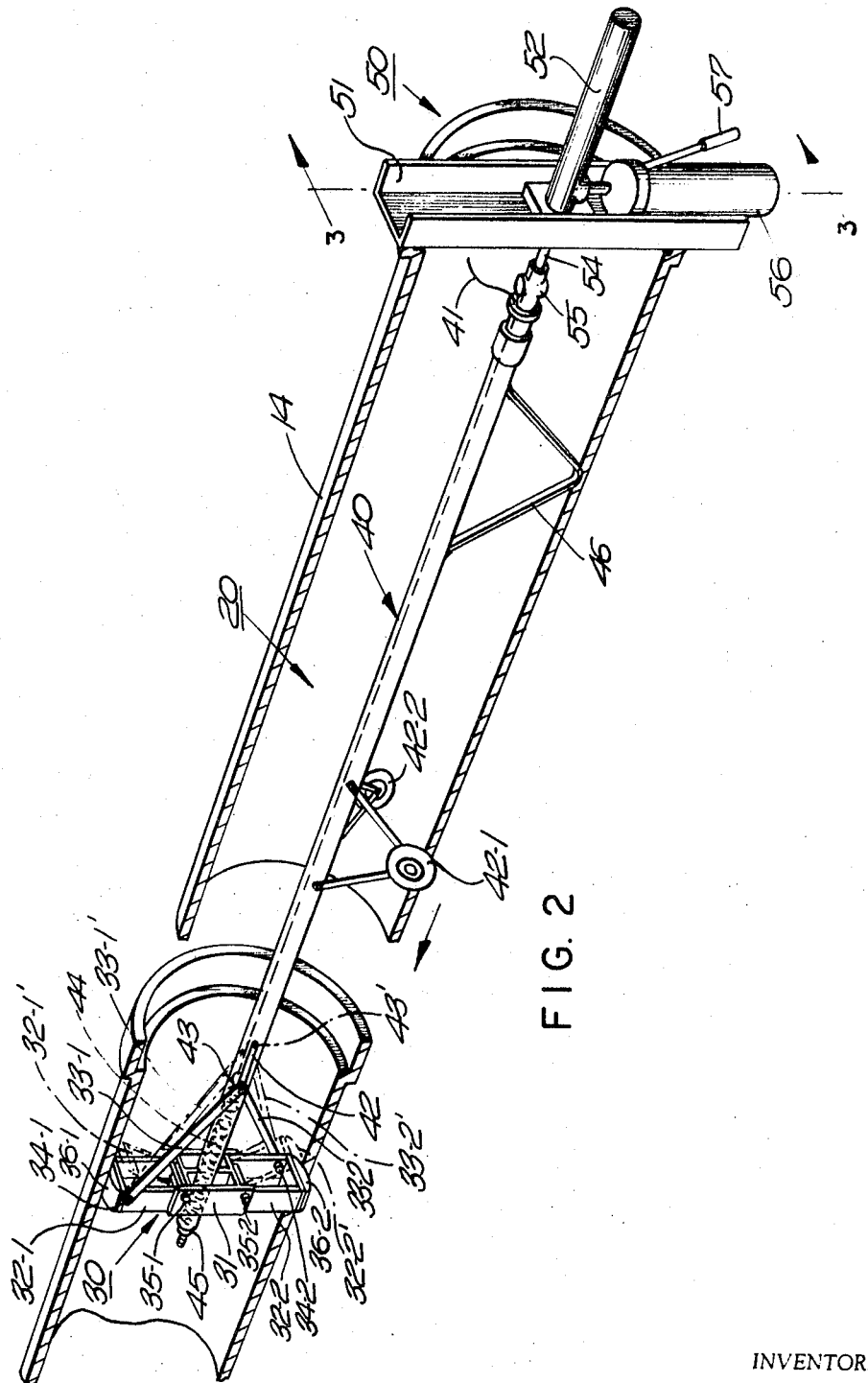
INVENTOR.
REMO R. PIZZAGALLI
BY
Dike, Thompson & Bronstein
ATTORNEYS United States Patent Office 3,469,298
Patented Sept. 30, 1969

3,469,298
PIPE PULLING APPARATUS
Remo R. Pizzagalli, Shelburne, Vt., assignor, by mesne assignments, to Atlas Pipe Popper Corporation, Farmingdale, N.Y., a corporation of New York
Filed Oct. 4, 1966, Ser. No. 584,196
Int. Cl. B23p 19/04
U.S. Cl. 29—237
7 Claims

ABSTRACT OF THE DISCLOSURE

This application discloses a method and apparatus for forcing one end of a pipe section into the end of a previously laid pipe section while in a trench, by using mechanical jacking means.

---

This invention relates to the positioning of objects, and more particularly to the positioning of individual sections of pipe.

In many industrial and constructional situations it is necessary to position one or more objects with respect to a pre-established reference point. Often there is limited access to the reference point, and to the object being positioned. In addition, where the items are bulky they are difficult to handle.

Such is the case in the construction industry where sections of pipe are laid end-to-end in a trench. Each succeeding section of pipe must be properly mated with the section that precedes it. The task of mating such sections of pipe is often confronted by a number of difficulties.

Frequently the trench has limited width. Occasionally it has substantial depth. In some kinds of terrain the walls of the trench tend to be unstable; in other kinds of terrain rock formations and ledges are encountered. Often the trench is partially filled with water. The presence of such conditions usually impedes, and sometimes prevents, the positioning of sections of pipe by conventional techniques.

Accordingly, it is an object of the invention to facilitate the positioning of objects. A related object is to facilitate the positioning of sections of pipe.

A further object of the invention is to facilitate the positioning of objects with respect to a pre-established reference point. A related object is to facilitate the mating of sections of pipe which are being laid in a trench.

A still further object of the invention is to facilitate the positioning of objects to which there is limited access, for example, sections of pipe which are being laid in a trench.

In accomplishing the foregoing and related objects, the invention provides an anchoring assembly that is constituted to controllably grip an interior surface of an object. The anchoring assembly includes spring controlled arms which grip the interior surface and an extension which is adapted to be coupled to a thrust producing jacking unit.

When the anchoring assembly grips the interior surface of a relatively fixed object, and extends into a displaceable object, coupling of the jacking unit to the extension, and into contact with the displaceable object, permits the application of a thrust which moves the displaceable object towards the fixed object.

Thus, taken together, the anchoring assembly and the jacking unit form a positioner by which a displaceable object may be mated to the open end of a relatively fixed object. The invention is particularly suitable for emplacing a newly laid section of pipe in a trench with respect to a previously laid section of pipe, the latter being maintained in a relatively fixed position by partial backfilling.

In an illustrative embodiment of the invention for emplacing sections of pipe, the anchoring assembly includes a plurality of arms which are pivotally mounted at one end of a longitudinal support member. A spring is axially disposed within the support member and acts upon at least one of the arms by way of a linkage so that in the fully retracted position of the spring, the arms are maximally pivoted away from the support member. In the maximally pivoted position of the arms, the anchoring assembly has an outer diameter in excess of the inner diameter of the sections of pipe. However, when the spring is expanded, as by the use of a control cable, the arms pivot towards the support member and the anchoring assembly can be positioned within a section of pipe as desired. As the control cable is released, the arms grippingly engage the interior surface of the pipe and the anchoring assembly is held fixedly in place.

The other end of the longitudinal support member forms an extension with respect to which the anchoring assembly is coupled to the jacking unit. With the arms of the anchoring assembly gripping the previously positioned section of pipe, the longitudinal support member extends into the newly laid, succeeding section of pipe to the vicinity of its open end where the jacking unit is in abutting contact.

For one embodiment of the invention the jacking unit includes a hydraulic cylinder with a piston rod extension that is connectable to the longitudinal support member. The hydraulic cylinder is mounted within a channel member that is disposed against the open end of the newly laid section of pipe. Consequently, when hydraulic fluid is pumped into the cylinder, with the piston rod extension connected to the support member, the fact that the anchoring assembly is located in a relatively fixed section of pipe prevents the support member from being displaced. Accordingly, the hydraulic fluid applies a thrust to the channel member and against the open end of the newly laid section of pipe, urging it into place.

In practice, the anchoring assembly is located within the two most recently emplaced sections of pipe. After the next section of pipe has been lowered into the trench near the preceding section, the anchoring assembly is released by pulling on the control cable and drawn forward into the newly lowered section of pipe. The jacking unit is mounted at the end of the newly lowered section of pipe, coupled to the support member and operated to emplace the last section. The jacking unit is then decoupled from the support member and a succeeding section of pipe is ready to be lowered into place.

Other aspects of the invention will become apparent after considering an illustrative embodiment thereof, taken in conjunction with the drawings in which:

FIG. 1 is a perspective and cross-sectional view of a typical environmental setting for the invention;

FIG. 2 is a partial perspective and cross-sectional view of pipe sections and a positioner in accordance with the invention; and FIG. 3 is a cross-sectional view of the hydraulic jacking unit for the positioner of FIG. 2.

Turning to the drawings, FIG. 1 illustrates a representative context for the invention. Previously laid sections of pipe 11 and 12 lie in a trench 13, which has been partially backfilled.

Extending from the vicinity of the bell-shaped end of the first section of pipe 11, and through the second section of pipe 12, is an anchoring assembly 20, which is one component of a positioner in accordance with the invention. The first section of pipe 11 is engaged at the head end of the anchoring assembly 20 by the arms of a gripping unit 30. At the opposite end of the anchoring assembly 20, a support member 40 contains a control cable 41. The anchoring assembly 20 remains in place until its gripper unit 30 is released by pulling on the control cable 41.

In general, the trench 13 is excavated a portion at a time, and crushed stone (not shown) is deposited to form a bedding. Bedding and backfill materials may be applied in a variety of ways. For example, a sectionalized shield in the form of one or more steel box frames may be placed in the trench 13 and advanced as each succeeding section of pipe is emplaced. Such a shield includes a chute for appropriately locating the bedding and backfill materials and, desirably, a platform for pumps by which the trench is dewatered. The bell-shaped end of the most recently emplaced section of pipe is advantageously capped temporarily by a bulkhead (not shown) to prevent the entry of materials during the bedding operation.

Once a suitable bedding has been established, the next section of pipe 14 is lowered to the vicinity of the bell-shaped end of the previously laid section of pipe 12. Illustratively in FIG. 1, the next section of pipe 14 to be emplaced is lowered using a sling 15 which is appropriately suspended, as by the boom of a crane (not shown). The new section of pipe 14 is then ready to be locked into place.

Ordinarily, the task of locking a section of pipe into place is accompanied by difficulties in alignment and in applying an appropriate longitudinal thrust. These difficulties are particularly acute where the trench 13 is deep and narrow. However, the desired locking action is readily achieved in accordance with the invention by reanchoring the assembly 20 of FIG. 1 as shown in FIG. 2, and by using the reanchored assembly in conjunction with a jacking unit 50. The anchoring assembly 20 and the jacking unit 50, taken together, form a positioner by which the most recently laid section of pipe 14 is locked into place against the bell-shaped end of the previously emplaced section of pipe 12.

To relocate the anchoring assembly 20 of FIG. 1 to the position shown in FIG. 2, the gripper unit 30 is released by pulling on the control cable 41, and the support member 40 of the anchoring assembly 20 is then moved forward into the newly laid section of pipe 14. This forward movement of the anchoring assembly 20 is facilitated by wheel members 42-1 and 42-2 which are attached to the support member 40. Also attached to the support member 40 is a support leg 46. The support leg 46 serves to restrict the position of the control end of the support member 40 and, thus, facilitate coupling to the jacking unit 50.

As portrayed in FIG. 2, the support member 40 takes the form of a hollow tube with a longitudinal slot 42 in the vicinity of the gripper unit 30. The slot 42 accommodates a longitudinally slidable link pin 43. Extending from the link pin 43 to the gripper end of the support member 40 is an internal spring 44 for actuating the gripper unit 30. The actuating tension applied by the spring 44 is varied by adjusting a nut 45. In order to permit release of the forces applied to the gripper unit 30 by the tension of the internal spring 44, the control cable 41 extends internally from the link pin 43 to the control end of the support member 40, where it emerges and is accessible to an operator.

Central to the gripper unit 30 is a hub 31 in which two arms 32-1 and 32-2 are pivotally mounted. Forces attributable to the tension of the spring 44 are applied to the arms 32-1 and 32-2 through associatd link members 33-1 and 33-2 at respective pivot points 34-1 and 34-2. As shown in FIG. 2 the pivot points 34-1 and 34-2 are on opposite sides of their corresponding arms 32-1 and 32-2. Illustratively, the hub 31 is formed by bolting side plates to upper and lower I-beam sections that are welded to the support member 30. The arms 32-1 and 32-2 are then pivotally connected to the side plates by bolts 35-1 and 35-2.

When the anchoring assembly 20 is being drawn through the previously laid section of pipe 12 to the position shown for the gripper unit 30 in FIG. 2, the control cable 41 is pulled forward so that the link pin is in a forward release position 43' in slot 42. Consequently, the spring 44 is expanded and the arms are disengaged from the interior surface of the pipe 12 and occupy release positions 32-1' and 32-2'. Correspondingly, the linkages occupy release positions 33-1' and 33-2'.

After the anchoring assembly 20 has been pulled by the support member 40 to the position shown in FIG. 2, the control cable 41 is released. This permits the internal spring 44 to retract and apply an axial thrust to the pin 43', drawing it along the slot 42 towards the hub 31 to the anchor position 43. The thrust applied to the pin 43 is transmitted to the pivot points 34-1 and 34-2 of the arms 32-1 and 32-2 through the linkages 33-1 and 33-2. The thrust at each pivot point becomes a torque which turns the arms 32-1 and 32-2 towards the inner surface of the pipe 12. As a result, the arms become anchored by wedged against the interior of the pipe with respect to the hub 31. To promote the anchoring, the arms 32-1 and 32-2 include pad members 36-1 and 36-2.

Once wedging has taken place, an outward axial thrust on the support member 40 merely promotes further wedging. This is because an outward thrust on the support member 40 applies components of force to the bolts 35-1 and 35-2 which tend to produce further rotation of the arms 32-1 and 32-2. Thus, the spring 44 is disposed so that its tension results in a wedging action which is assisted by an axial thrust on the support member 40.

Consequently, the anchoring assembly 20 establishes a reference with respect to which the newly laid section of pipe 14 can be locked into place. Locking is accomplished by coupling the jacking unit 50 to the control end of the support member 40 of the anchoring assembly 20.

Since the anchoring assembly 20 tends to remain fixed in the face of an axially outward thrust on the support member 40, fluid pressure applied to the jacking unit 50 will draw the newly laid section of pipe 14 into place.

Framing the jacking unit 50 is a channel member 51, which is adapted to be seated against the rim at the bell-shaped end of the pipe 14. Centered on the channel member 51 is a hydraulic cylinder 52 containing an internal piston 53 shown by FIG. 3. The internal piston 53 is attached to a rod 54 which extends through the channel member 51. Attachment of the piston rod 54 of the jacking unit 50 to the anchoring assembly 20 is accomplished in conventional fashion, as by the use of a knuckle joint 55. A pump cylinder 56 mounted in the channel member 51 forces hydraulic fluid, indicated by arrows, into the cylinder 52 by operation of a pump handle 57. A packing 58 surrounds the piston rod 54 at the channel member 51 to prevent the pump fluid from leaking from the cylinder 52 while the newly laid pipe 14 of FIG. 2 is being jacked into place.

The action of the jacking unit 50 in drawing the pipe 14 against the pipe 12 is more particularly illustrated by the cross-sectional view of FIG. 3. As seen in FIG. 3 operation of the handle 57 of the pump cylinder 56 forces fluid against the piston 53 and against that portion of the channel member 51 abutting the hydraulic cylinder 52. Since the piston rod 54 is rigidly connected to the support member 40 of FIG. 2, it cannot be displaced. Indeed, an outward axial thrust, as discussed earlier, merely increases the wedging action of the gripper unit 30 of FIG. 2 with respect to the earlier laid section of pipe 12. As a result, the entry of hydraulic fluid into the chamber of the hydraulic cylinder 52 forces the channel member 51 towards the securely anchored support member 40 to the position of the dashed-line channel member 51'. Simultaneously the hydraulic cylinder 52 moves until its capped end is in the vicinity of the relatively stationary piston 53, at which point the newly laid section of pipe 14 has been moved in the direction indicated by the arrows of FIG. 2 to be locked against the bell-shaped end of the previously laid section of pipe 12.

Once the newly laid section of pipe 14 is locked into place, the jacking unit 50 is decoupled from the support member 40 of the anchoring assembly by releasing the knuckle joint 55, and backfilling takes place. A bedding is then prepared for a further section of pipe.

In a test model of the invention the anchoring assembly 20 was of aluminum. The support member 40 was a pipe 1½ inches in diameter with a wall thickness of 0.145 inch and extending for a length of 9 feet 3 inches. The control cable 41 was a nylon rope and the pad members 36–1 and 36–2 were of rubber.

The channel member 51 of the jacking unit 50 for a tested model of the invention was also of aluminum, measuring 32 inches in length and 6 inches in width, with channel sides 2 inches in depth and a thickness of ⅜ inch. The jack cylinder 56 had a capacity of two tons.

Using the test model, an interceptor sewer line of pipe 18 to 24 inches in diameter and 8 feet in length was laid at the rate of 200 feet per day in trenches with a width of 5 feet and a depth up to 19 feet.

Other modifications and adaptations of the invention will occur to those skilled in the art.

I claim:
1. Pipe pulling apparatus comprising a longitudinal slotted tubular support member with one end adaptable to be positioned within a pipe having an opening therein and with another end extending outwardly from said opening, and means at said one end of the support member for gripping an interior surface of said pipe which comprises a plurality of arm members pivotally connected at one end to said support member for engaging the interior surface of said pipe, a plurality of link members pivotally connected at one end to said arms and slidably connected at the other end to said slotted portion of said tubular member, and an axially actuated coil spring means longitudinally mounted within said support member, said coil spring being connected to said other end of said link members whereby tension of said spring against said link members imparts a component of force to said arm members for maintaining the engagement of said arm members with the interior surface of said pipe, whereby said apparatus is anchored within said pipe.

2. Apparatus as defined in claim 1 further including means for releasably disengaging said arm members from said interior surface by increasing the tension of said coil spring.

3. Apparatus as defined in claim 2 wherein the releasing means comprises a control cable attached to the connection of said arm member with said link member.

4. Apparatus as defined in claim 3 wherein said control cable extends from said link member within said tubular member to the outward positionable end thereof.

5. Apparatus as defined in claim 1 for positioning a newly laid section of pipe with respect to a previously laid and a relatively fixed section of pipe wherein one end of said support member being positionable within said previously laid section of pipe and the other end of said support member being positionable within said newly laid section of pipe, the arm members of the gripping means being pivotally connected to said one end of said support member by a hub which is positionable within said previously laid section of pipe, a slidable pin in the slot of said support member, said plurality of links being pivotally connected to respective ones of said arms and to said slidable pin, and said coil spring being connected within said tubular support member to said slidable pin, whereby said arms are able to grippingly engage the interior surface of said relatively fixed section of pipe.

6. Apparatus as defined in claim 5 further including a hydraulic jacking unit adaptable to be coupled to the end of said support member within said newly laid section of pipe for applying a thrust thereto, whereby said thrust is able to matingly position said newly laid section of pipe against said previously laid section of pipe.

7. Apparatus as defined in claim 6 wherein said jacking means comprises a channel member positionable against the end of said newly laid section of pipe, a hydraulic cylinder mounted upon said channel member and containing a rod member extending therethrough, means for coupling said rod member to said support member, and means for actuating said cylinder by hydraulic fluid, whereby the entry of hydraulic fluid into said cylinder is able to longitudinally displace said channel member and position said newly laid section of pipe against said previously laid, relatively fixed section of pipe.

References Cited

UNITED STATES PATENTS

| | | | |
|---|---|---|---|
| 306,263 | 10/1884 | Laffey | 294—97 X |
| 1,540,566 | 6/1925 | Petree | 294—97 |
| 2,487,902 | 11/1949 | Stout et al. | 29—252 X |
| 2,613,983 | 10/1952 | Knudsen | 94—97 |
| 2,170,461 | 8/1939 | Pepperdine | 29—261 X |
| 2,879,101 | 3/1959 | Daroci | 254—29 X |
| 3,368,270 | 2/1968 | Babian | 29—237 |

FOREIGN PATENTS 23,207   5/1906   Great Britain.

CHARLIE T. MOON, Primary Examiner

U.S. Cl. X.R.

29—252, 238, 525; 294—97